Oct. 29, 1968  W. B. PEARCE III  3,407,612
SUBMARINE PIPELINE CAISSON
Filed Feb. 4, 1966  8 Sheets-Sheet 1

INVENTOR
WYLIE B. PEARCE, III
BY Kimmel, Crowell & Weaver
ATTORNEYS.

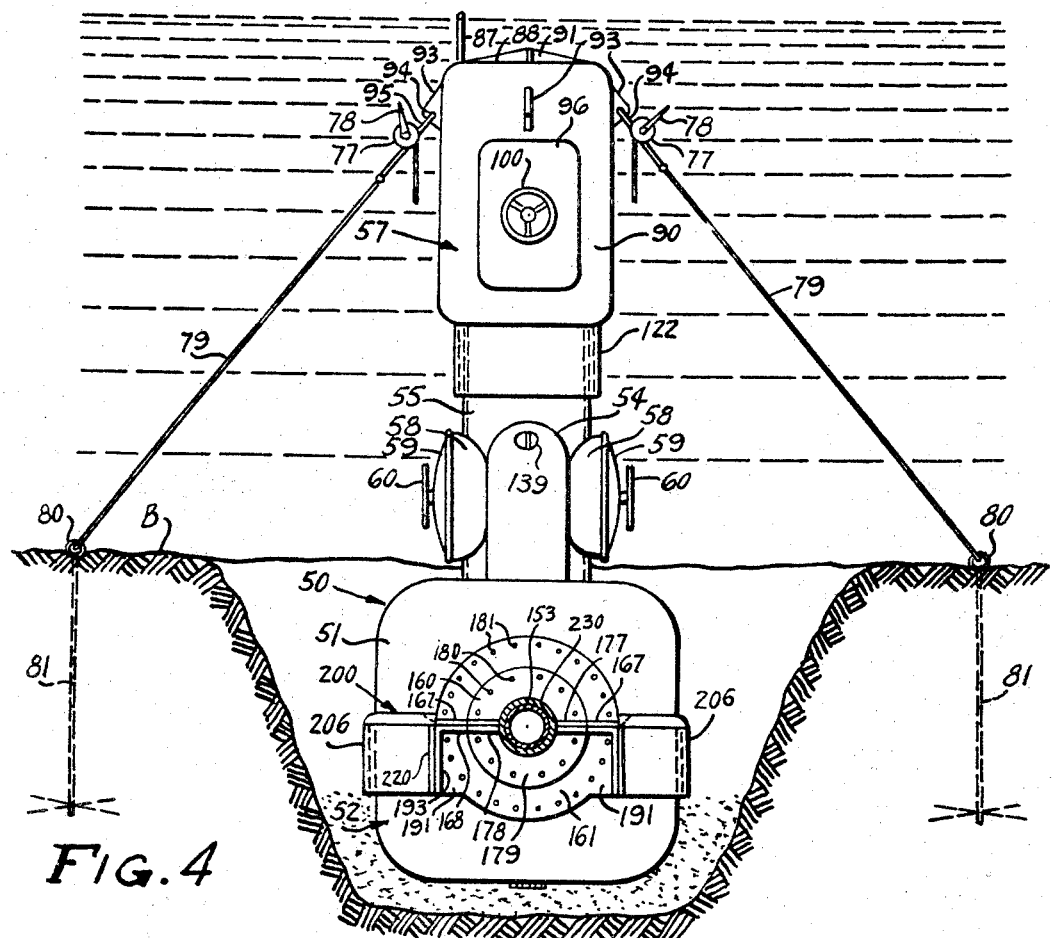
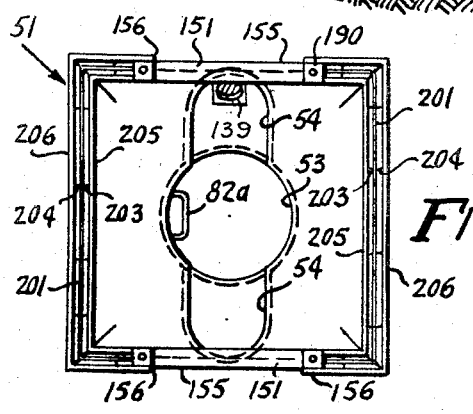
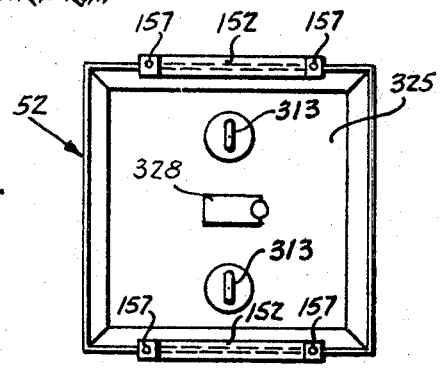
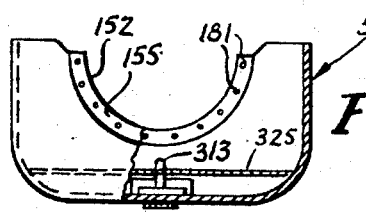

Oct. 29, 1968　　　　　W. B. PEARCE III　　　　　3,407,612
SUBMARINE PIPELINE CAISSON

Filed Feb. 4, 1966　　　　　　　　　　　　　　8 Sheets-Sheet 3

INVENTOR.
WYLIE B. PEARCE, III
BY Kimmel, Crowell & Weaver
ATTORNEYS.

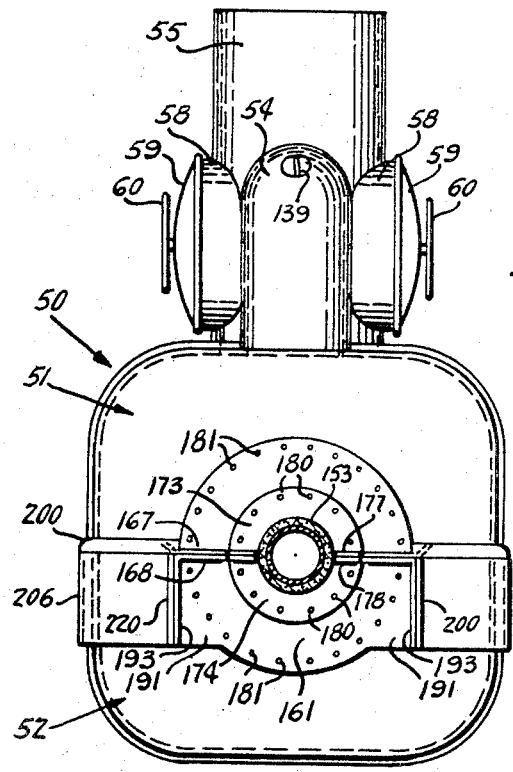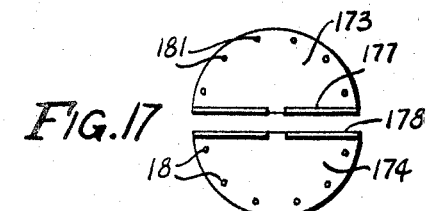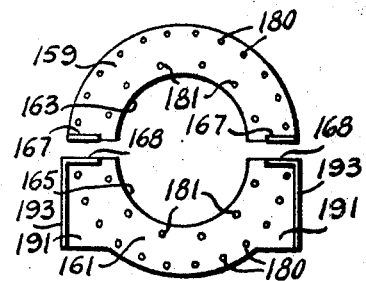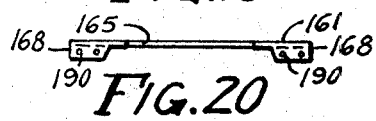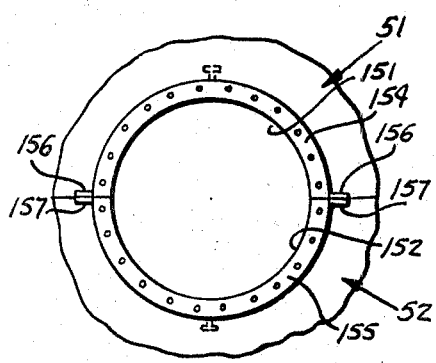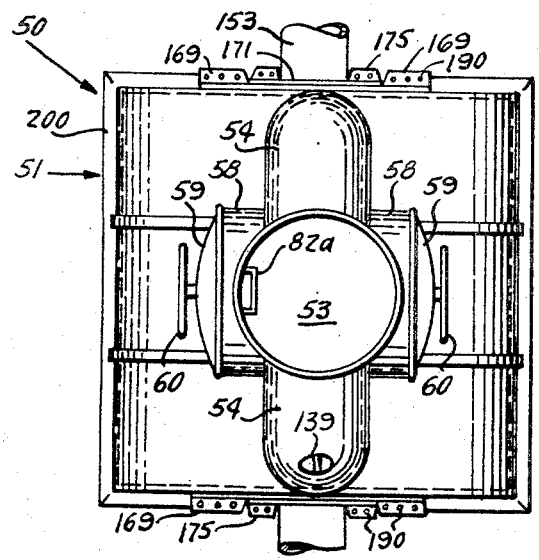

Oct. 29, 1968 — W. B. PEARCE III — 3,407,612
SUBMARINE PIPELINE CAISSON
Filed Feb. 4, 1966 — 8 Sheets-Sheet 5

INVENTOR.
WYLIE B. PEARCE, III
BY Kimmel, Crowell & Weaver
ATTORNEYS.

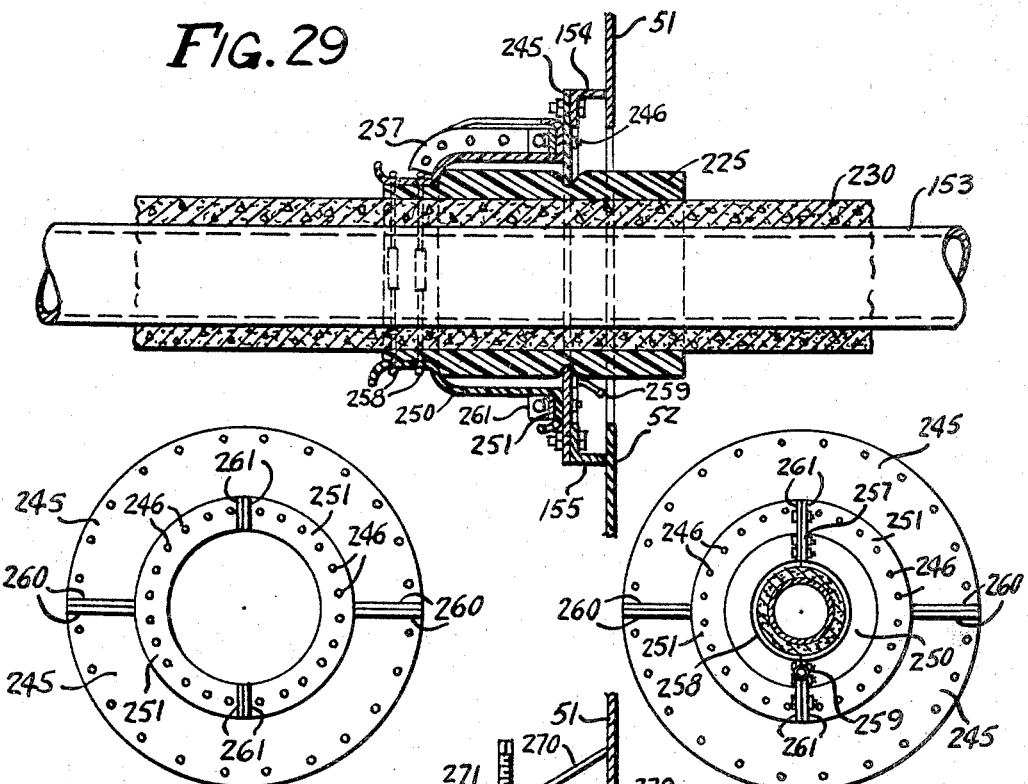
FIG. 29
FIG. 30
FIG. 31
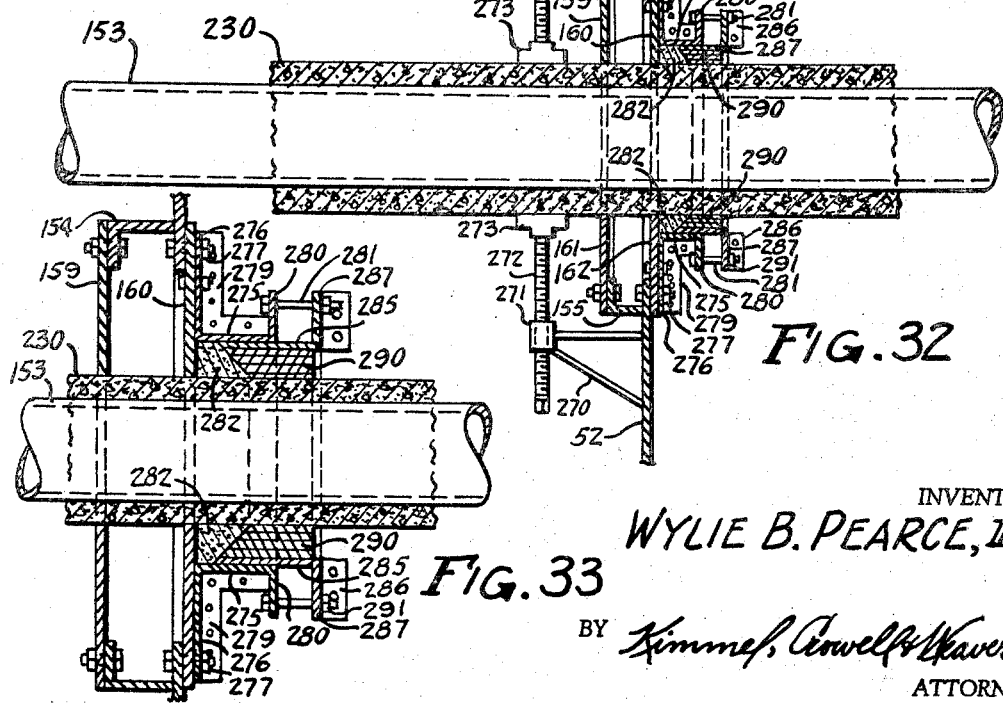
FIG. 32
FIG. 33
INVENTOR.
WYLIE B. PEARCE, III
BY Kimmel, Crowell & Weaver
ATTORNEYS.

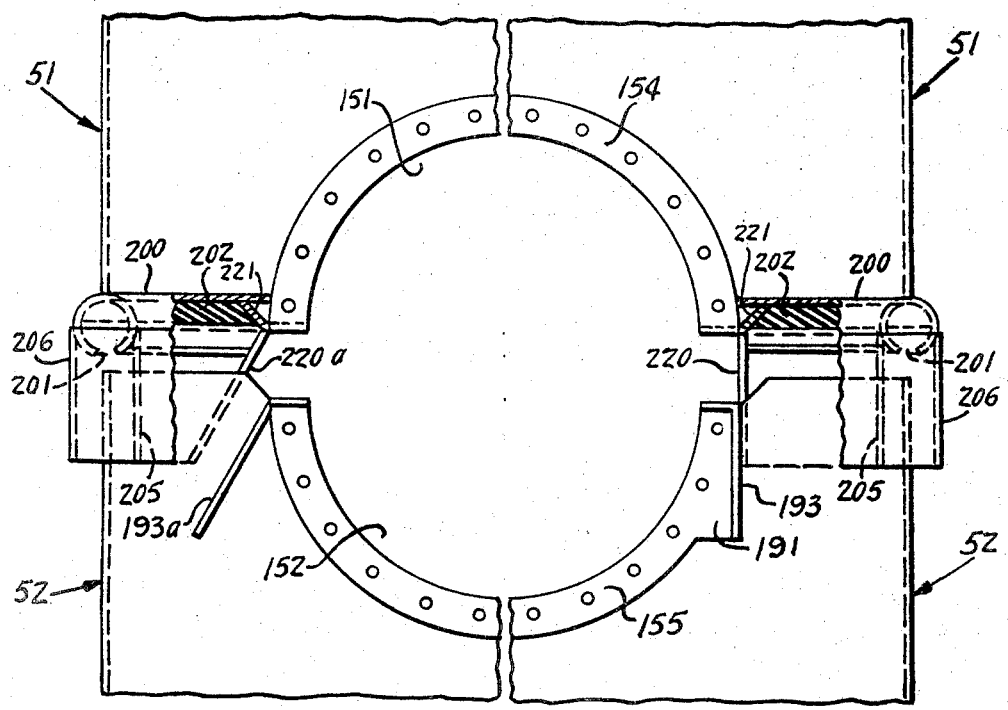
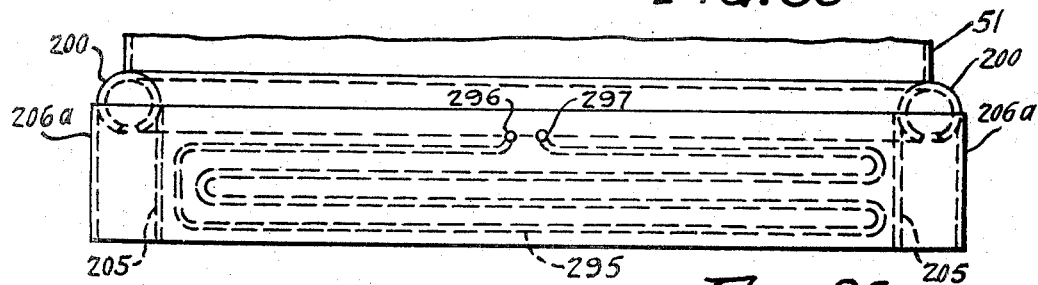
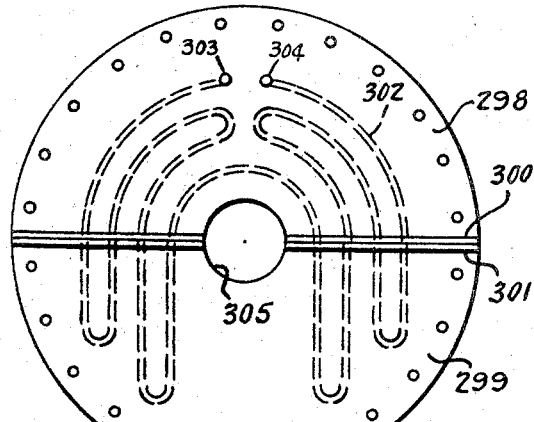

United States Patent Office 3,407,612
Patented Oct. 29, 1968

3,407,612
SUBMARINE PIPELINE CAISSON
Wylie B. Pearce III, 413 W. McNeese St.,
Lake Charles, La. 70601
Filed Feb. 4, 1966, Ser. No. 525,017
27 Claims. (Cl. 61—81)

ABSTRACT OF THE DISCLOSURE

Submergible bell-type apparatus forming a work chamber or compartment for water-tight engagement about an underwater object, the compartment being of such size as to accommodate one or more mechanics and to provide them with sufficient space to perform work on the engaged object, the apparatus including means for supplying air under pressure for evacuating the chamber of water accumulated during its installment and for breathing purposes; and the apparatus further including a second chamber or compartment of such size as to accommodate said mechanics; the first and second compartments being connected in spaced relationship relative to one another via an open-ended tubular section providing the mechanics with ingress and egress means to the work compartment; there being pressure held water-tight door or closure means interposed between the second compartment and the adjacent end of the tubular section and similar closure means on said tubular section intermediate the ends thereof; and means for supplying air under pressure to said compartment.

This invention relates to a submarine pipeline caisson and has as its primary object the provision of an improved air-tight working chamber which may be positioned in surrounding relation relative to a section of submarine pipe or the like so that access may be had thereto for purposes of repair, installation of a valve tap, reinforcement, replacement, or any other operation which it is desired to perform on a submerged pipeline therein.

A further object of the invention is the provision of a device of this character which may be readily adapted to a wide variety of sizes of pipelines, such, for example, as those which are used to deliver oil and gas from offshore to on-shore facilities, and which after the necessity for the use of the caisson has been removed, may be readily removed from the section of pipeline affected, and reutilized in other localities.

An additional object of the invention is the provision of a caisson of this nature which may be employed in either relatively deep or shallow water, interchangeable facilities being provided, there being provided an open entrance conduit extending to the surface of the water for shallow water work, and a submerged air-tight entrance and egress chamber which may be employed in relatively deep water.

A further object of the invention is the provision of a device of this character which may be positioned around a section of pipe to be worked on which will provide a completely fluid-tight seal about the pipe section, avoiding all possibility of leakage of water into the caisson.

Still another object of the invention is the provision of an improved seal between separable sections of a caisson, to enable the same to be positioned around the pipe, the seal being so arranged so as to be completely effective, and at the same time readily separable when it is desired to separate the sections of the caisson in order to remove the same.

A further object of the invention is the provision of improved sealing means for securing the end portions of the apparatus in fluid-tight relation on opposite sides of a section of pipe to be worked upon.

Still another object of the invention is the provision of a seal as mentioned in the previous paragraph, including a blind plate or flange which is cut in situ to accommodate the specific diameter of pipe to which application of the caisson is required.

A further object of the invention is the provision of a caisson of this nature which may be installed or positioned for use, and removed, with a minimum of time, effort, and difficulty.

Still another object of the invention is the provision of a caisson of this nature which is sturdy and durable in construction, reliable and efficient in operation, and relatively inexpensive to manufacture, utilize, and maintain.

Still other objects reside in the combinations of elements, arrangements of parts, and features of construction, all as will be more fully pointed out hereinafter, and disclosed in the accompanying drawings, wherein there are shown preferred embodiments of this inventive concept.

In the drawings:

FIGURE 4 is a view similar to FIGURE 3, but showing a complete unit adapted for deep water usage, including a submerged entrance and escape chamber therefor.

FIGURE 5 is a view looking upwardly from the bottom of the upper half of the sectional caisson of FIGURES 1 or 4, parts thereof being sectioned.

FIGURE 6 is a top plan view of the bottom section of the caisson, parts thereof being shown in section.

FIGURE 7 is an end elevational view of the bottom of the caisson shown partially in elevation and partially in section.

FIGURE 15 is an end elevational view of the caisson assembly, prior to the in situ cutting of the blind plates for fitting to a pipe.

FIGURE 16 is a top plan view of the caisson.

FIGURE 17 is a plan view of the removable blind plate or flange comprising an integral element of the device, which is adapted to have an opening cut therein after the precise measurement of the diameter of the pipe to be worked on has been determined.

FIGURE 18 is an end elevational view of one of the sections of the blind flange of FIGURE 17.

FIGURE 19 is a complementary flange or plate to which the flange 17 is adapted to be attached, and which in turn is adapted to be attached to a gland on the caisson.

FIGURE 20 is a top plan view of the lower section of the flange of FIGURE 19.

FIGURE 21 is an elevational view taken from the inside of the caisson showing the pipe line sealing gland to which the flnage of FIGURE 19 is adapted to be attached.

FIGURE 26 is a sectional view showing a modified or auxiliary form of pipe sealing gland which may be used as an additional seal about the pipe to be worked upon if desired.

FIGURE 29 is a view similar to FIGURE 26 but showing a further modified form of sealing means.

FIGURE 30 is a plan view of one of the components of the sealing structure of FIGURE 29.

FIGURE 31 is a view similar to FIGURE 30 but showing the device in position about a pipe.

FIGURE 32 is a view similar to FIGURE 29 but showing a still further modified form of sealing arrangement.

FIGURE 33 is an enlarged detailed view of the structure of FIGURE 32 prior to compression.

FIGURE 34 is a fragmentay side elevational view partially in section showing a constructional detail.

FIGURE 35 is a view similar to FIGURE 34 but on the opposite side thereof showing a modified form of the constructional detail shown in FIGURE 34.

FIGURE 36 is a fragmentary side elevational view, concealed portions thereof being indicated in dotted lines showing an assembly of cooling coils forming a modified form of sealing construction used in conjunction with the instant invention.

instant invention. And

Figure 3:
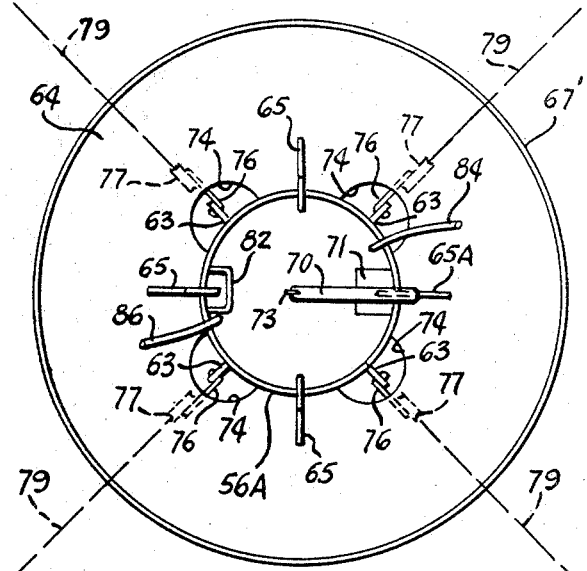
FIGURE 3 is a top plan view of the structure of FIGURE 2.

FIGURE 37 is an elevational view, concealed portions thereof being indicated in dotted lines, showing cooling coils in the face plate adapted to surround the pipe, for the purpose of imparting a frozen seal thereto.

Similar reference characters refer to similar parts throughout the several views of the drawings.

Having reference now to the drawings in detail, the caisson comprising an essential element of the instant invention is generally indicated at 50 and includes an upper shell 51 and a lower shell 52. Upper shell 51 includes a top opening 53, on opposite sides of which are hollow upwardly extending shoulders 54 to provide additional head room within the caisson. A tubular section 55 extends upwardly between shoulders 54 in sealed relation with opening 53, and is adapted to be connected, under certain conditions to be described more fully hereinafter, to a tube 56, or alternatively, to an entrance and egress chamber on shell generally indicated at 57.

Tubular passageways 58 extend laterally on opposite sides of tube 55 between shoulders 54 and are provided with outside emergency closures 59, which are provided with external opearting handles 60 and internal operating handles 61, so that emergency ingress or egress may be provided to the interior of the caisson when necessary.

Figure 1:
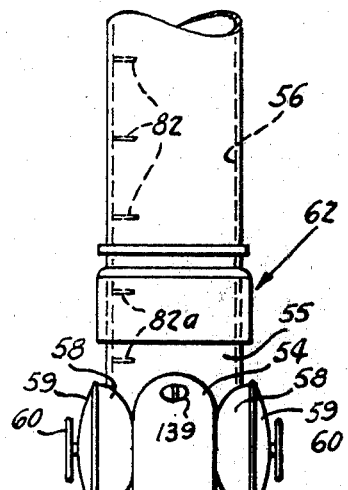
FIGURE 1 is an end elevational view of one form of caisson constructed in accordance with the instant invention shown in position around a section of submarine pipe, the latter being sectioned, and the upper portion of the device being broken away.
Figure 2:
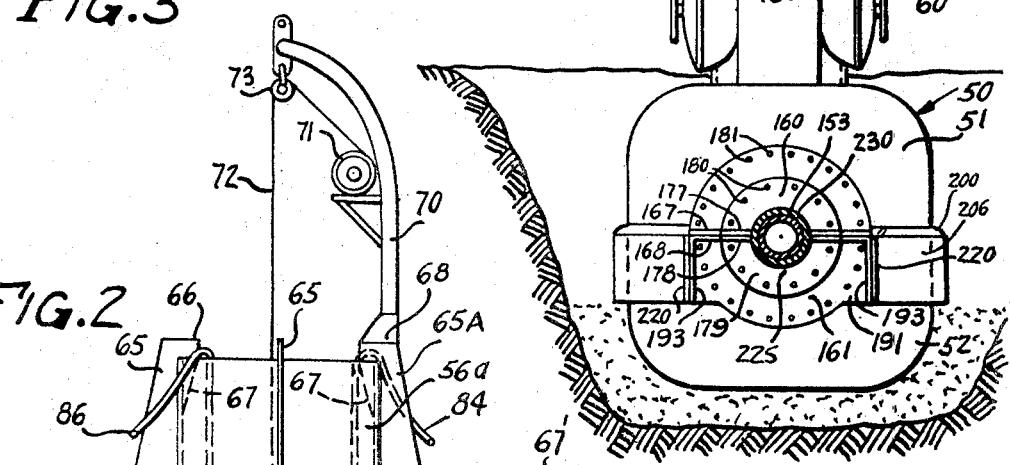
FIGURE 2 is a side elevational view of the portion of the escape conduit of FIGURE 1 which extends above the surface of the water, showing a working platform attached thereto.
Figure 8:
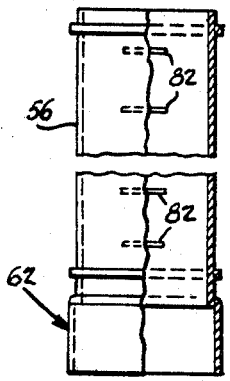
FIGURE 8 is a side view, partially in elevation and partially in section, and partially broken away disclosing the tubular conduit or passageway, which extends from the caisson to the escape chamber or the surface of the water.
Figure 10:
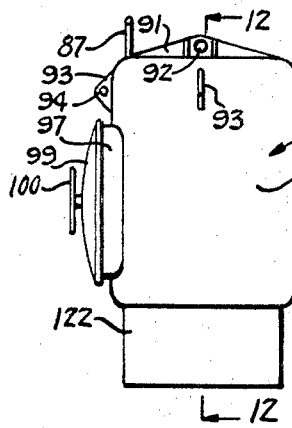
FIGURE 10 is a side elevational view of the escape chamber shown in FIGURE 4.
Figure 12:
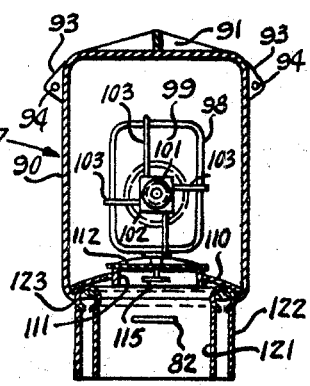
FIGURE 12 is a sectional view taken substantially along the line 12—12 of FIGURE 11 as viewed in the direction indicated by the arrows.
Figure 9:
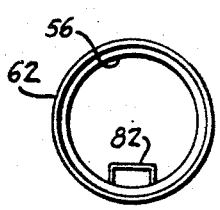
FIGURE 9 is a sectional view taken transversely through the conduit of FIGURE 8.
Figure 11:
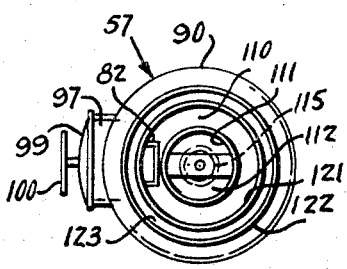
FIGURE 11 is a bottom plan view of the escape and entrance chamber of FIGURE 10.
Figure 13:
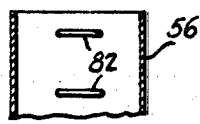
FIGURE 13 is a fragmentary sectional view showing the interior of the conduit or passage between the caisson and the escape chamber, showing a constructional detail.
Figure 14:
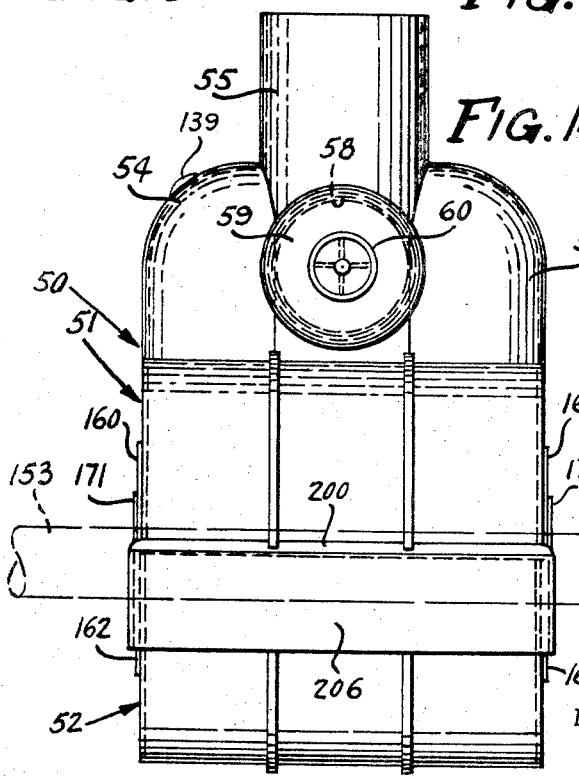
FIGURE 14 is a side elevational view of the caisson assembly.

When caisson 50 is employed in shallow water, tube 56 is employed as shown in FIGURES 1, 2 and 3. The tube 56 which may be of any desired length is provided with sealing means generally indicated at 62, which may, in shallow water, be of any conventional design using an internal sealing gasket, not shown, or which, alternatively, may be of a type comprising an element of the instant invention and will be more fully shown and described hereinafter. However, under low pressure conditions such as exist in relatively shallow water, such sealing means may not be necessary. One or more sections of tube 56 may be employed, the uppermost of which extends above the water level L as at 56A in FIGURE 2. Sections 55 and 56 may, if desired, be joined by the conventional bolt and flange method under certain conditions. Radially positioned flanges 65 support a platform 64 above water level L, the platform being supported from the top of tube 56A by inwardly extending lips 66 and depending portions 67 which anchor over the top portion 56A of tube 56. The platform may have a railing 67 for safety, and one of flanges 65, 65A, preferably supports a swivel mounting 68 which carries a crane or davit 70, the latter being provided with a hoist 71 which may be motorized if desired which energizes a suitable cable 72 which extends over pulley means 73 in conventional manner for the introduction and removal of supplies and materials into and out of tube 56 and thus to caisson 50.

Cut away openings 74 in the platform 64 provide access to radial flanges 63 which are provided with openings 75 through which cables 76 extend, suitable tensioning mechanism 77 including operating handles 78 being provided in a position which is readily accessible through the openings 74. The tensioning mechanisms in turn are connected to cables 79 which extend to the eyes 80 of conventional swamp augers 81, which are imbedded in the bottom B of the body of water, and serve to stabilize the tube 56 and its associated platform.

Ladder rungs 82 and 82A are suitably spaced apart on the interior of tubes 56 and 55 to permit the exit and ingress of personnel in the caisson 50.

When the caisson is employed in shallow water an air compressor line 84 and an electric power supply line extend thereover to appropriate sources of air and electricity carried by an appropriate tender. The function of the compressed air in effectuating sealing means in the caisson will be more fully described hereinafter.

Figure 23:
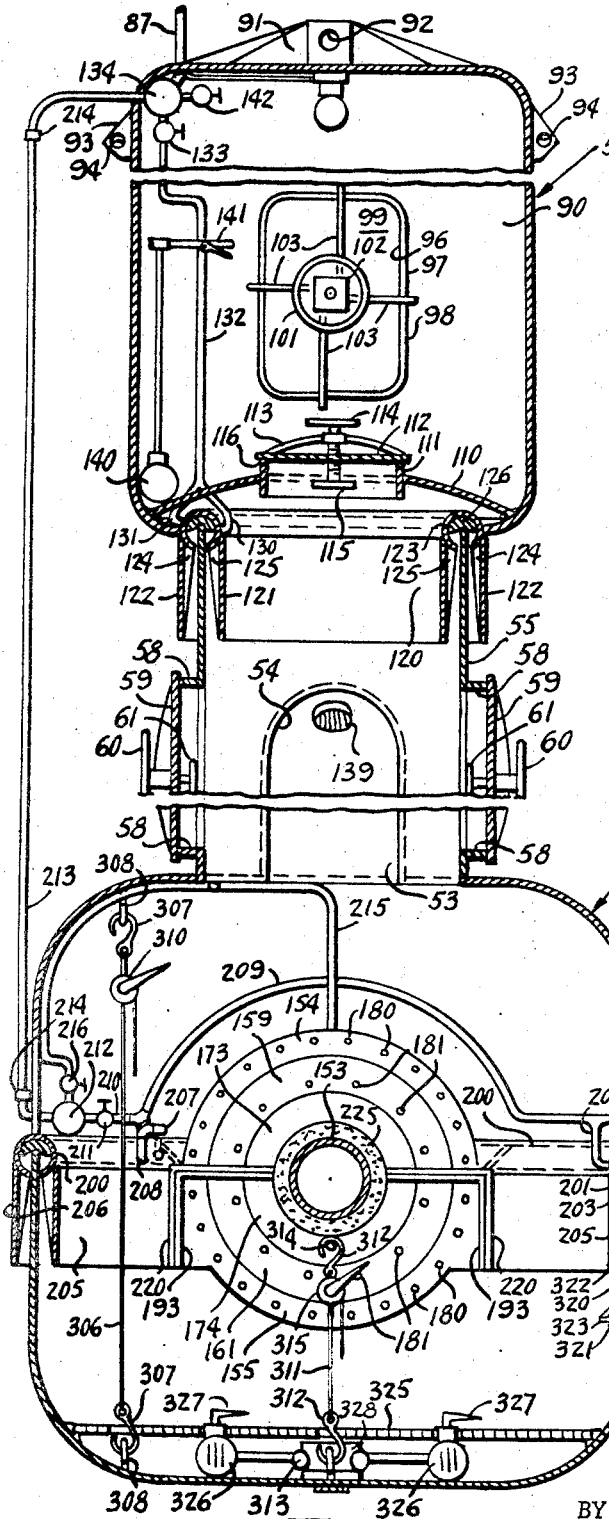
FIGURE 23 is a vertical longitudinal sectional view taken substantially through the center line of the structure of FIGURE 4 showing the interior of the caisson, and certain mechanisms employed in assembling the same, and further disclosing the interior of the escape chamber.

When the device is employed in deep water, the accompanying tender (not shown) carries both the compressor and generator, compressed air and electricity being supplied to the caisson 50 and the entrance escape chamber 57 through lines 87 and 88, respectively, as shown in FIGURES 4 and 23.

Shell 57 is employed when caisson 50 is utilized in deep water, and consists of a substantially rectangular chamber 90 which is provided on top with a reinforcing rib 91 having a lifting eye 92 therein to accommodate the hook of a crane or the like for positioning the device. Laterally extending flanges 93 are apertured as at 94 to receive the ends of cables 95 which are connected to tensioning devices 77 having operating handles 78 of any desired conventional type as discussed in conjunction with the shallow water modification. The tensioning devices in turn are connected to cable 79 which extend to swamp augers 81 imbedded in the bottom of the body of water. Shell or chamber 57 is provided with a side opening 96 surrounded by a flange 97 and the sealing gasket 98 and is closed by a water-tight door 99 having an external operating handle 100. An internal operating handle 101 is also provided, the operating handles serving to rotate a block 102 which actuates extending locking bars 103 positioned internally of the shell on all four sides of the opening 96. As best shown in FIGURE 23, the lower portion of shell 57 is closed by an arcuate partition 110 which has a tubular opening 111 centrally located therein, which is closed by a pressure door 112, the latter being held in position by clamping bars 113 actuated from opposite sides by operating handles 114 and 115. A suitable sealing gasket 116 is also provided.

Figure 25:
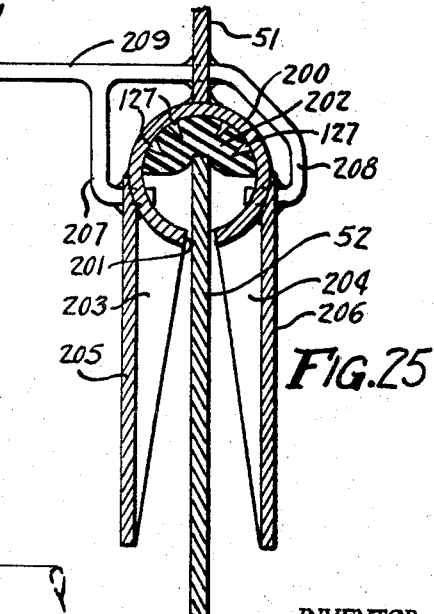
FIGURE 25 is a view similar to FIGURE 24 showing a section taken through the caisson sealing gland between the upper and lower sections thereof.

Below bottom 110 shell 57 is provided with a relatively large opening 120, characterized by a depending internal flange 121 and an external flange 122 which extend from opposite sides of a semicircular annulus 123 surrounding opening 120. Guide gussets 124 and 125 are positioned in confronting relation on the inner sides of outer flanges 122 and the outer sides of inner flange 121. The upper portion of annulus 123 is filled with a compressible gasket 126, which may be held in place by suitable pins, as shown in FIGURE 25, the pins being indicated at 127. Air under pressure is supplied to opposite sides of annulus 123 through tubes 130 and 131, which in turn connect to a common air line 132. The latter extends through a control valve 133 to an air manifold 134, the latter being supplied with high pressure air through line 87 from a tender or the like.

In the assembly of the device, shell 57 is seated tightly on the top of tube 55, with the rim of the latter seating firmly in gasket 126, the weight of the shell affording a relatively tight seal in itself, the guide gussets 124 and 125 serving to center the device. However, when high pressure air is introduced through line 131 exteriorly of tube 55, a completely effective air seal is provided, since the air pressure exceeds that of the surrounding water, the surplus air escaping downwardly about external flange 122. Similar pressure on the inside between the wall of tube 55 and flange 121 escapes downwardly through tube 55 in the caisson 50, the pressure thus being equalized, and a completely effective fluid-tight air seal being provided. The compressed air escaping under flange 121 also provides adequate fresh air ventilation. This air is immediately discharged by an air exhaust blower 139 located in one of shoulders 54, and carries with it any fumes generated by welding or a ruptured pipe line.

Obviously, when a diver enters or leaves shell 57 through door 99, water will enter the chamber. A valve 140 controlled by a hand lever 141 may then be opened, and high pressure air may be drawn directly from manifold 134 by means of a blowout valve 142 to clear shell 57 of water before hatch or door 112 is opened.

Figure 22:
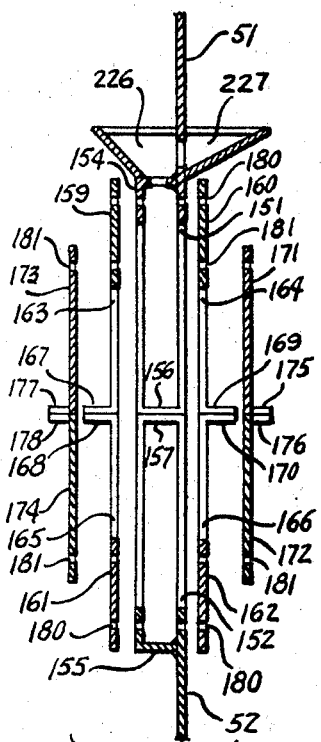
FIGURE 22 is an exploded plan view showing the flanges and gland of FIGURES 17, 19 and 21 in position for assembly.
Figure 24:
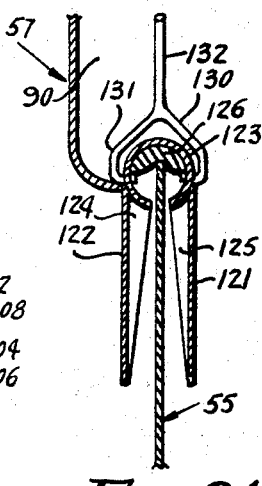
FIGURE 24 is an enlarged fragmentary sectional view showing the air seal between the conduit and the escape chamber.

Referring now to caisson 50, top and bottom shells 51 and 52 are each provided in each end with semicircular openings 151 and 152, which, when in registry and the caisson is assembled, define a circular opening at each end of the caisson, through which openings the pipe 153 which is to be worked upon extends. As best shown in FIGURES 21 and 22, each semicircular opening is provided interiorly with a semicircular channel 154 and 155, flanges 156 and 157 being provided at each end thereof for registry of the components. Inner and outer closure plates 159 and 160 are also provided for upper shell 51 and corresponding lower inside and outside closure plates 161, 162 are provided for lower opening 152. Each of plates 159, 160, 161 and 162 is also provided with a semicircular opening 163, 164, 165 and 166, respectively, and at each end of the semicircle, each is provided with an aligning flange 167 and 168 for inner closure plates 159 and 161 and 169 and 170 for outer closure plates 160 and 162.

Semicircular inside and outside upper and lower blind plates are also provided, the outside upper and lower plates being designated at 171 and 172, respectively, and the inside lower plates being designated at 173 and 174, respectively. Each blind plate is provided with a registering flange across the meeting sides, the flanges being designated, respectively, as 175, 176, 177, and 178. Aligned bolt holes 180 extend through the outer peripheries of plates 159, 160, 161, and 162, channels 154 and 155 and the portions of the side walls surrounding the openings 151 and 152. Concentric rows of bolt holes 181 extend through the outer periphery of blind plate sections 171, 172, 173 and 174, and about the periphery of openings 163, 164, 165, and 166, so that two sets of bolts extended through the aligned bolt holes hold the components securely in related assembly.

With the parts in assembled relation, the flanges 156, 167 and 177 define, as shown in FIGURE 15, a substantially straight inside flange across the lower edge of top shell 51, while the flanges 157, 168 and 178 define a corresponding aligned flange along the top edge of lower shell 52 completely extending across the central openings 151 and 152. Aligned bolt holes 190 extended through flanges 177 and 178, flanges 167 and 168, and flanges 156 and 157, permit the components to be tightly bolted together, and sealed with appropriate sealing material, to provide a unitary water-tight structure, with an internal air sealing chamber formed by the portions 154 and 155, in a manner to be more fully described hereinafter. All of the last-mentioned bolt holes bear generally the reference character 190 for simplicity and convenience.

Sealing means are provided between the upper and lower shells 51 and 52, and take generally the form previously described in connection with the seal between tube 55 and entrance and egress chamber 57. Extending completely about the side and end portions of upper shell 51, but terminating short of the semicircular end openings therein, are cylindrical tubes 200, having slotted bottom portions 201, in the upper halves of which are positioned sealing gaskets 202, which are imbedded on prongs 127, to secure the same in position. The upper edges of lower section 52 extend through slots 201 and seat firmly in gaskets 202, being guided therein by means of guide gussets 203 and 204 which extend inwardly from internal and external depending flanges 205 and 206. There is thus provided an air chamber interiorly of the tube members 200 on each side of top edge 52, compressed air being supplied thereto through inner and outer lines 207 and 208, which in turn are supplied by a common line 209. The external tubes 208 on each side of the end openings extend through the wall of upper section 51 and are integrally sealed or welded thereto. A line 210 extends through a control valve 211 to a caisson air manifold 212, which is supplied through a line 213, which is shown exteriorly of the caisson, but which may be contained interiorly and extend upwardly through tube 55, line 213 extending to upper air manifold 134, and being supplied with compressed air from the line 87. Suitable fittings 214 may be provided to accommodate various lengths of air line. By virtue of this arrangement, air under pressure is continually introduced into the interior of the caisson through lines 207, passing downwardly about inner flange 205, while at the same time air under pressure completely fills the space between the upper edge of shell 52 and flange 206, and being at greater pressure than the surrounding water, forms an air seal, the air escaping around the lower edge of external flange 206.

Air under pressure is provided to the air seal around pipe 153, which will be described more fully hereinafter, by means of lines 215, which extend through control valves 216 from air manifold 212.

As shown in FIGURES 15, 23 and 35, the ends of tubes 200 are plugged and welded at 221 in air tight sealed relation to form a seal where the caisson tubes 200 tie into the housing 154. The space between inner and outer flanges 205 and 206 adjacent the central circular openings is closed by end plates 220, which when the parts are in assembled relation, closely engage flanges 193 which are welded to the caisson, effectively to prevent the escape of air from the ends of the seal. Suitable sealing material may be interposed between the abutting faces or flanges 193 and 220 may be welded together, although minute leakage of air in this area is not critical. A slightly modified form of construction of this nature is disclosed in FIGURE 34, wherein flange 193A is disposed at an angle and flange 220A is correspondingly angled to facilitate fitting of the components. The use and purpose of the end seals in the two figures is otherwise identical.

After the caisson is assembled about pipeline 153 in a manner which will be more fully described hereinafter, it is necessary to effectively seal the ends of the caisson through which the pipe 153 extends. Under normal conditions, a hole of suitable size is site cut in blind plates 171 and 172 forming the exterior seal and blind plates 173 and 174 forming the interior seal. The pipe is then effectively wrapped with a suitable gasket sealing material and the pipeline gland comprised of the several plates hereinbefore described is fitted tightly around the wrapped pipe, the gasket material being indicated at 225 (FIGURES 1, 4, 15 and 23). A high pressure air sealing gland thus exists in the space between plates 171 and 172, and plates 173 and 174, space being afforded by the offset plate portions 155 and 154. High pressure air is communicated to this space through the line 215 as previously described.

Under normal conditions of use, such a seal is highly effective, and will render the area about the pipe to be worked on substantially fluid tight. Under some conditions, a cement or plastic seal may be employed by filling the space between the inside of the walls of shells 51 and 52 and the offset plate portions 154 and 155 with cement, molten material which is unsoluble in water, or other suitable sealing matter. Such material in liquid state may be poured into this space through internal and external funnel-shaped openings 226 and 227 as indicated in FIGURE 22.

Under other conditions, as when used in unduly deep water, or when it is necessary to work with a relatively low inside air pressure, additional sealing means may be employed.

Figure 27:
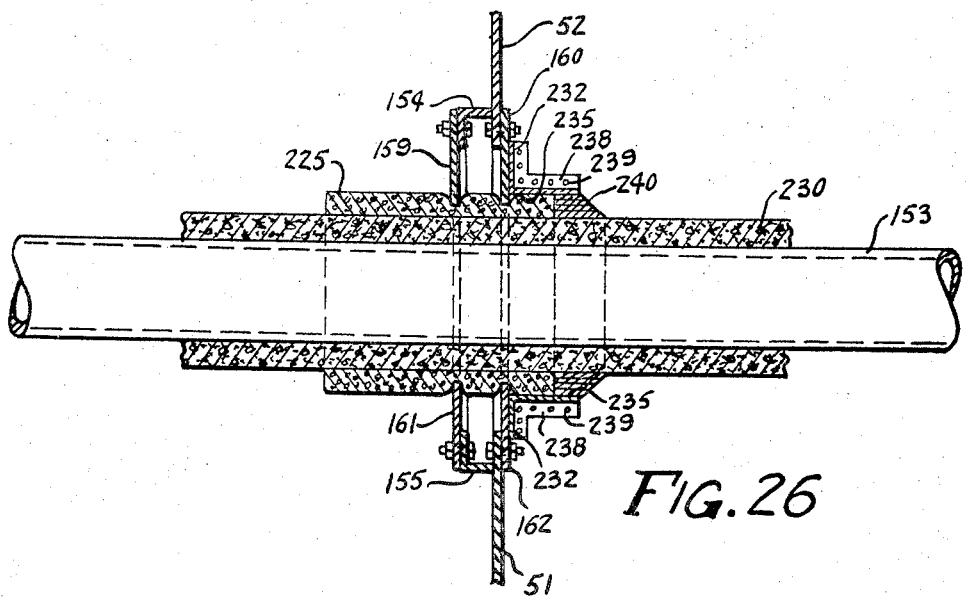
FIGURE 27 is a side sectional view of one of the components of the auxiliary seal of FIGURE 26.
Figure 28:
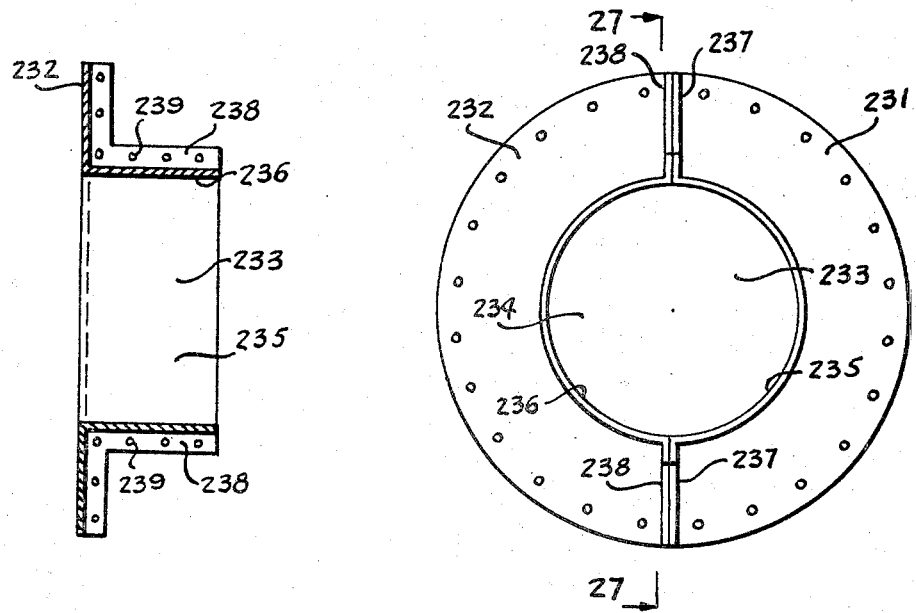
FIGURE 28 is a plan view of the component disclosed in FIGURE 27.

One form of auxiliary seal which may be used either externally or internally of the caisson is disclosed in FIGURES 26 to 28, inclusive. Here the pipe 153 which as shown is provided with a concrete casing 230 and with the usual gasket wrapping 225, and the caisson walls 51 and 52 assembled in the usual manner. In this case, on the exterior side where plates 171 and 172 and 169 and 162 are normally provided and bolted to the flanges 154 and 155 to define an internal air chamber, a pair of plates 231 and 232 having semicircular openings 233 and 234 therein are substituted for plates 171 and 172, the openings being surrounded by semicircular flanges 235 and 236, coaxial with pipe 153, defining a housing for an auxiliary packing gland. Longitudinal coupling flanges 237 and 238 provided with suitable bolt holes 239 are provided for bolting the housing components together. A calking compound or sealing material 240 is then tightly wedged interiorly of housing formed by flanges 234 and 235, in abutting relation with the end of the wrapping 225, and effectively serves as an auxiliary sealing means.

FIGURES 29 and 30 disclose still another form of seal, which may be used either alone, as shown, or in combination with external and internal sealing plates, as previously described, therein. In this modication, an inner or outer sealing plate 245 is bolted or otherwise secured to the flange members 154 and 155 and has in turn secured thereto an annular one-piece flexible sock packing gland 250. The sock includes a face flange 251 through which bolts 246 are passed, and clamping flanges 257 to seal the seam of the sock. Suitable wire clamps 258 are provided tightly to clamp the end of the sock about the gasket material 225, and a high pressure air coupling 259 permits the introduction of air under pressure into the sock to enhance the seal if necessary. It should be pointed out that the flange 251 is provided with a central split circular opening which may be cut in situ if desired, which clampingly engages the gasket material 225 as shown in FIGURE 29 to provide an inner seal for the high pressure air. Plates 245 are separable as previously discussed, and connected in the usual manner by means of flanges 260, while flange 251 is similarly split and connected by means of flanges 261, as best shown in FIGURES 30 and 31.

Plate 245 may, if desired, be identical to the previously described plates 160 and 162, and preferably includes seal means such as flanges 220 or 220A for sealing off the ends of the caisson seal.

FIGURES 31, 32 and 33 disclose a still further modified form of sealing means, which may, if desired, be employed without gasket material 225, and applied directly to a cement coated pipe 230. In this form of the invention, the upper and lower caisson sections are connected, as previously described, with plates 160 and 162, and 159 and 161 being suitably positioned in the semicircular openings in the upper and lower shell halves. Air may or may not be introduced into the chamber thus formed as in the previous modifications. In this form of the invention, hanger arms 270 are suitably secured interiorly or exteriorly of the caisson walls and provided with threaded bushings 271, through which extend line-up screw jacks 272, provided with shoes 273 which follow the contour of the pipe closely in order to enable accurate alignment of the pipe within the opening. A two-piece annular packing gland 275 provided with a face flange 276 is suitably secured as by means of bolts 277 to flanges or plates 169, 162, for example. Face flange 276 is split and provided with connecting flanges 279 similar to those previously described, while the packing gland housing 275 is also provided with upstanding rear flange 280, provided with a plurality of bolt holes through which extend bolts 281. A space is provided between packing gland housing 275 and pipe coating 230 for packing rope or similar compound 282. An annular slip collar housing 285 is telescopically mounted relative to the packing gland housing, and is provided with connecting flanges 286 which connect the separable halves of an annular slip collar face flange 287.

A plurality of annular adjustable shims 290 are positioned between the pipe covering 230 and the slip collar housing 285. Nuts 291 are positioned on bolts 281 exteriorly of face flange 287, so that by tightening the nuts 291 the face collar 287 and its associated slip collar housing 285 are moved inwardly tightly to wedge the shims into the packing 282, thus effecting an extremely tight and effective seal.

Still another method of sealing is disclosed in FIGURES 36 and 37 wherein the outer flange 206A corresponding to the flange 206 of the upper caisson shell is provided interiorly with cooling coils 295 having a refrigerating fluid entrance 296 and exit 297, to which refrigerant is supplied from any desired source, preferably from a compressor or the like carried by the tender. The extreme cooling of the flange 206 effectively freezes the water between flanges 205 and 206A, and affords an extremely efficacious seal. FIGURE 37 shows a similar treatment wherein a split plate 298 and 299 provided with the usual coupling flanges 300 and 301 is provided with internal cooling coils 302 having a fluid entrance 303 and exit 304 for the circulation of refrigerant therethrough from any desired source. The plates 298 and 299 may be substituted for any of the previously described plates fitting closely about the pipe, and refrigerant circulated through coils 302 will effectively freeze the water immediately adjacent the pipe extended through the center opening 305 and provide an efficacious seal.

In the use and operation of the caisson of the instant invention, a trench T is first dug into the bottom B of the body of water beneath the section of pipe 153 to be worked upon. The section of the pipe to be treated is wrapped in sections adjacent the openings at the opposite ends of the caisson with suitable gasket material 225, as previously described. The diameter of the wrapped pipe is accurately measured and the blind flanges or plates 171, 172, 173 and 174 are cut to accurate dimensions corresponding to the diameter of the wrapped pipe. Plate assemblies 159 and 161, and 160 and 162 or other previously described sealing means are then bolted into position in the upper and lower caisson portions 51 and 52. The lower half 52 of the caisson is then lowered into the trench and raised by appropriate means into engagement with the pipe section. The upper half 51 of the caisson is then lowered into position and secured thereto.

Cables 306 having hooks 307 on opposite ends thereof are then secured between eyes 308 in the bottom shell 52 and correspondingly aligned eyes 309 in the top shell, and bottom shell 52 is winched into position by means of suitable winch assemblies 310, preferably of conventional ratchet and pawl design.

Auxiliary tightening cables 311 may be connected between hooks 312 at their ends and eyes 313 and the central bottom of the bottom half of the shell and a cable looped about pipe 153, or alternatively an eye 314 connected to a selected plate, by means of winching mechanism 315, thus ensuring a complete tight fit of all the component parts. The upper and lower caisson halves or sections may then be secured together by means of bolts 320 and nuts 321 which extend through openings in lugs 322 carried by the lower portions of flanges 205 and lugs 323 carried interiorly of lower shell 52.

Tube 56 and platform 64 may then be assembled to the top shell section or alternatively, entrance and egress chamber 57 may be suitably positioned on the top of the tube 55. Anchoring cables 79 are then extended to appropriate positions and secured to swamp augers 81 which are imbedded in the bottom for stabilizing the assembly.

Lower shell 52 is preferably provided with a grating floor 325, beneath which are positioned exhaust valves 326 operable by handles 327 for exhausting fluid from the caisson. An air actuated sump pump 328 is also located in the bottom of the caisson to remove any silt or other material that might tend to clog valve 326.

After the previously described portion of the operation has been completed, the air and electrical connections are made, and air under pressure is pumped through the line 87 into the manifolds 134 and 212, and then through the previously described lines to effect the previously described seals. Excessively high pressure may be used initially, and by opening valves 140 and 326, all fluid interiorly of the caisson 50, tube 55 and chamber 57 may be exhausted. The pressure is then reduced to the desired level, and entry may be effected either through water tight door 99 and hatch 112, or through the open top of tube 56 in accordance with the assembly. There is thus provided a section of submerged pipe which is completely surrounded by the caisson, wherein an operator may work on the pipe without the necessity of diving equipment, and wherein the pipe may be repaired, or a valve or branch line inserted therein, without the necessity of disconnecting and reassembling the pipe line, and the consequent filling of the pipe line with water. Obviously, when the operation is completed, the caisson may be disassembled and transported to another location for further use. Either atmospheric pressure or high pressure air may be employed interiorly of the assembly, depending upon the uses and conditions under which it is employed, and, in the event of accidental dislodgment of the swamp augers due to weather or the like, and the consequent tilting of the device on its side, any workers or operators imprisoned therein may escape through the oppositely disposed side escape hatches 59, at least one of which will be clear at all times, in the event that door 99, for example, is resting on the bottom.

From the foregoing, it will now be seen that there is herein provided an improved caisson assembly including improved sealing means therefor, which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative and not in a limiting sense.

What is claimed is:

1. A caisson for use in work on submerged pipe lines comprising, in combination, a lower shell adapted to be placed beneath a pipe line, an upper shell seating on said lower shell, said upper and lower shells having opposed registering semi-circular openings in the opposite ends thereof through which the pipe line is adapted to extend, sealing means between the upper and lower shells, additional sealing means in each circular opening surrounding the pipe line, entrance and egress means for said caisson and wherein said sealing means between said upper and lower shells comprises a gasket surrounding the lower edge of said upper shell, diverging downwardly extending flanges on each side of said gasket, the upper edge of said lower shell seating against said gasket between said flanges, and means for introducing air under pressure into the space on each side of said upper edge and the adjacent flange.

2. The structure of claim 1 wherein said entrance and egress means includes an opening in the top of said upper portion, a tube adapted to extend upwardly above the surface of the water in which the pipe line is submerged and a working platform surrounding the top of said tube above the water level.

3. The structure of claim 1 wherein said entrance and egress means includes an opening in the top of said upper shell, a tube extending from said opening, an entrance chamber sealed to the outer end of said tube, a pressure door between said tube and said entrance chamber, a pressure door affording entrance to said entrance chamber, and pressure means for evacuating water from said chamber.

4. The structure of claim 2 wherein anchor means extends from said tube into the bottom beneath the water in spaced relation to said tube.

5. The structure of claim 3 wherein anchor means extend from said air chamber into the bottom beneath the water in spaced relation to said tube.

6. The structure of claim 3 wherein emergency exit means comprising oppositely disposed auxiliary pressure doors are provided in said tube.

7. The structure of claim 1 wherein an initially solid split plate is provided dimensioned to cover the circular opening formed by said semi-circular openings at each end of said caisson, and means are provided for securing said plate to said caisson, said plate being cut in situ to form an opening dimensioned to accommodate a particular diameter of pipe, and sealing means are positioned about said pipe in said last-mentioned opening.

8. A caisson for use in work on submerged pipelines comprising, in combination, a lower shell adapted to be placed beneath a pipeline, an upper shell seating on said lower shell, said upper and lower shells having opposed registering semi-circular openings in the opposite ends thereof through which the pipeline is adapted to extend, sealing means between the upper and lower shells, additional sealing means in each circular opening surrounding the pipeline, entrance and egress means for said caisson, and wherein an initially solid split plate is provided to cover the circular opening formed by said semi-circular openings at each end of said caisson, means for securing said plate to said caisson, said plate being cut in situ to form an opening dimensioned to accommodate a particular diameter of pipe, sealing means positioned about said pipe in said last-mentioned opening, and wherein said initially solid split plate is bolted in sealed relation over an opening in a split second plate, which is in turn bolted about said circular opening formed by said semi-circular openings.

9. The structure of claim 8 wherein flanges secured to said second plate define an air chamber surrounding the opening in said initially solid plate surrounding said pipe, and air under pressure is introduced into said air chamber.

10. A caisson for use in work on submerged pipelines comprising, in combination, a lower shell adapted to be placed beneath a pipeline, an upper shell seating on said lower shell, said upper and lower shells having opposed registering semi-circular openings in the opposite ends thereof through which the pipeline is adapted to extend, sealing means between the upper and lower shells, additional sealing means in each circular opening surrounding the pipeline, entrance and egress means for said caisson, said entrance and egress means including an opening in the top of said upper portion, a tube adapted to extend upwardly above the surface of the water in which the pipeline is submerged, a working platform surrounding the top of said tube above the water level, and wherein said upper shell is provided with upwardly extending shoulders on opposite sides of said opening in the top to provide working space for an operator in said caisson.

11. A caisson for use in work on submerged pipelines comprising, in combination, a lower shell adapted to be placed beneath a pipeline, an upper shell seating on said lower shell, said upper and lower shells having opposed registering semi-circular openings in the opposite ends thereof through which the pipeline is adapted to extend, sealing means between the upper and lower shells, additional sealing means in each circular opening surrounding the pipeline, entrance and egress means for said caisson, an initially solid split plate covering the circular opening formed by said semi-circular openings at each end of said caisson, means for securing said plate to said caisson, said plate being cut in situ to form an opening dimensioned to accommodate a particular diameter of pipe, sealing means positioned about said pipe in said last-mentioned opening, and wherein said sealing means includes an outwardly extending annulus coaxial with the pipe and caulking compound positioned between said annulus and the pipe.

12. A caisson for use in work on submerged pipelines comprising, in combination, a lower shell adapted to be placed beneath a pipeline, an upper shell seating on said lower shell, said upper and lower shells having opposed registering semi-circular openings in the opposite ends thereof through which the pipeline is adapted to extend, sealing means between the upper and lower shells, additional sealing means in each circular opening surrounding the pipeline, entrance and egress means for said caisson, an initially solid split plate covering the circular opening formed by said semi-circular openings at each end of said caisson, means for securing said plate to said caisson, said plate being cut in situ to form an opening dimensioned to accommodate a particular diameter of pipe, sealing means positioned about said pipe in said last-mentioned-opening, and wherein said sealing means includes an annulus extending outwardly from said plate in coaxial relation with the pipe, a telescopic tube in said annulus, radial face flanges on said annulus and said tube, bolts extending between said radial flanges, nuts on said bolts, packing rope in said tube adjacent said initially solid plate, shims in said tube between the radial flange thereon and said packing rope whereby tightening of said nuts compresses said shims against said packing rope to effect a seal.

13. A caisson for use in work on submerged pipelines comprising, in combination, a lower shell adapted to be placed beneath a pipeline, an upper shell seating on said lower shell, said upper and lower shells having opposed registering semi-circular openings in the opposite ends thereof through which the pipeline is adapted to extend, sealing means between the upper and lower shells, additional sealing means in each circular opening surrounding the pipeline, entrance and egress means for said caisson, an initially solid split plate covering the circular opening formed by said semi-circular openings at each end of said caisson, means for securing said plate to said caisson, said plate being cut in situ to form an opening dimensioned to accommodate a particular diameter of pipe, sealing means positioned about said pipe in said last-mentioned opening, and wherein an annular flexible sock is secured about the opening formed in said initially solid plate around the pipe and means are provided for sealing the free end of said sock around the pipe.

14. The structure of claim 13 wherein the inner end of said sock is sealed relative to said initially solid plate and air under pressure is introduced into said sock.

15. A caisson for use in work on submerged pipe lines comprising, in combination, a lower shell adapted to be placed beneath a pipeline, an upper shell seating on said lower shell, said upper and lower shells having opposed registering semi-circular openings in the opposite ends thereof through which the pipeline is adapted to extend, sealing means between the upper and lower shells, additional sealing means in each circular opening surrounding the pipeline, entrance and egress means for said caisson, an initially solid split plate covering the circular opening formed by said semi-circular openings at each end of said caisson, means for securing said plate to said caisson, said plate being cut in situ to form an opening dimensioned to accommodate a particular diameter of pipe, sealing means positioned about said pipe in said last-mentioned opening, and wherein said initially solid plate is provided with internal cooling coils for freezing water around the opening formed therein to provide a frozen seal.

16. The structure of claim 1 wherein said flanges extending downwardly on the outside of said gasket are provided with cooling coils for freezing the water between said outside flanges and said upper edge of said lower shell to provide a frozen seal.

17. The structure of claim 8 wherein said split plates are provided with corresponding flanges along the split portions thereof, and said flanges are bolted together with the plates surrounding the pipe.

18. The structure of claim 1 wherein said upper and lower shells are provided with internal bolt means for securing the same in related assembly about the pipe.

19. The structure of claim 1 wherein an initially solid split plate is provided dimensioned to cover the circular opening formed by said semi-circular openings at each end of said caisson, and means are provided for securing said plate to said caisson, said plate being cut in situ to form an opening dimensioned to accommodate a particular diameter of pipe, and sealing means are positioned about said pipe in said last-mentioned opening.

20. The structure of claim 19 wherein said second plate is provided with flange means on the sides of the split therein and corresponding flanges extend over the space between said diverging downwardly extending flanges.

21. The structure of claim 19 wherein an annular flexible sock is secured about the opening formed in said initially solid plate around the pipe and means are provided for sealing the free end of said sock around the pipe.

22. The structure of claim 19 wherein the inner end of said sock is sealed relative to said initially solid plate and air under pressure is introduced into said sock.

23. The structure of claim 19 wherein said initially solid plate is provided with internal cooling coils for freezing water around the opening formed therein to provide a frozen seal.

24. The structure of claim 19 wherein said flanges extending downwardly on the outside of said gasket are provided with cooling coils for freezing the water between said outside flanges and said upper edge of said lower shell to provide a frozen seal.

25. The structure of claim 18 wherein said upper and lower shells are provided with corresponding eyes in the bottom and top thereof respectively, and winch means are provided for pulling said shells together around the pipe.

26. The structure of claim 1 wherein means are provided for introducing air under pressure into said caisson.

27. The structure of claim 2 wherein said entrance chamber and said caisson is each provided with a water escape valve.

References Cited

UNITED STATES PATENTS

| | | | |
|---|---|---|---|
| 962,019 | 6/1910 | Flood et al. | 61—81 |
| 1,853,379 | 4/1932 | Rotinoff | 61—81 |
| 1,894,206 | 1/1933 | Talbot | 61—81 |
| 2,187,871 | 1/1940 | Voorhees | 61—81 X |
| 2,812,641 | 11/1957 | Elliot | 61—81 |
| 2,931,187 | 4/1960 | Perkins | 61—82 |
| 3,111,812 | 11/1963 | Clarke | 61—81 |

REINALDO P. MACHADO, *Primary Examiner.*